United States Patent
Block

[11] 3,765,130
[45] Oct. 16, 1973

[54] MOUNTING FOR ABRASIVE DISC
[75] Inventor: Aleck Block, Los Angeles, Calif.
[73] Assignee: Merit Abrasive Products, Inc., Compton, Calif.
[22] Filed: Dec. 23, 1971
[21] Appl. No.: 211,396

[52] U.S. Cl. .............................................. 51/378
[51] Int. Cl... B24d 17/00, B24d 13/14, B24d 13/20
[58] Field of Search .................. 51/358, 377–379; 151/69; 85/1 K

[56] References Cited
UNITED STATES PATENTS

| | | | |
|---|---|---|---|
| 1,832,362 | 11/1931 | Cullinan | 151/69 |
| 2,168,126 | 8/1939 | Kane | 85/1 K |
| 2,409,163 | 10/1946 | Stever | 51/379 |
| 2,657,509 | 11/1953 | Turton et al. | 51/379 |
| 2,839,879 | 6/1958 | Eisenbeis | 51/377 |
| 2,902,799 | 9/1959 | Beck | 51/379 |
| 3,623,281 | 11/1971 | Moffat | 51/377 |
| 3,667,169 | 6/1972 | MacKay | 51/379 |

*Primary Examiner*—Othell M. Simpson
*Attorney*—Ellsworth R. Roston

[57] ABSTRACT

Mounting for an abrasive disc for quickly mounting the disc on a wheel adapted for attachment to a power operated spindle or arbor and without the use of tools, or removing the disc from the wheel by a reversal of the manipulation of attaching. The mounting includes a retainer to which the disc is secured and which embodies a clamping flange overlying the abrasive surface in the marginal region of a central aperture, and an extension disposed through the aperture and keyable to a stud threaded in the hub of the wheel. The stud can be drawn up within the hub by relative rotation of disc and hub to compress the disc between the flange and the hub.

22 Claims, 3 Drawing Figures

PATENTED OCT 16 1973

PATENTED OCT 16 1973
3,765,130
SHEET 2 OF 2
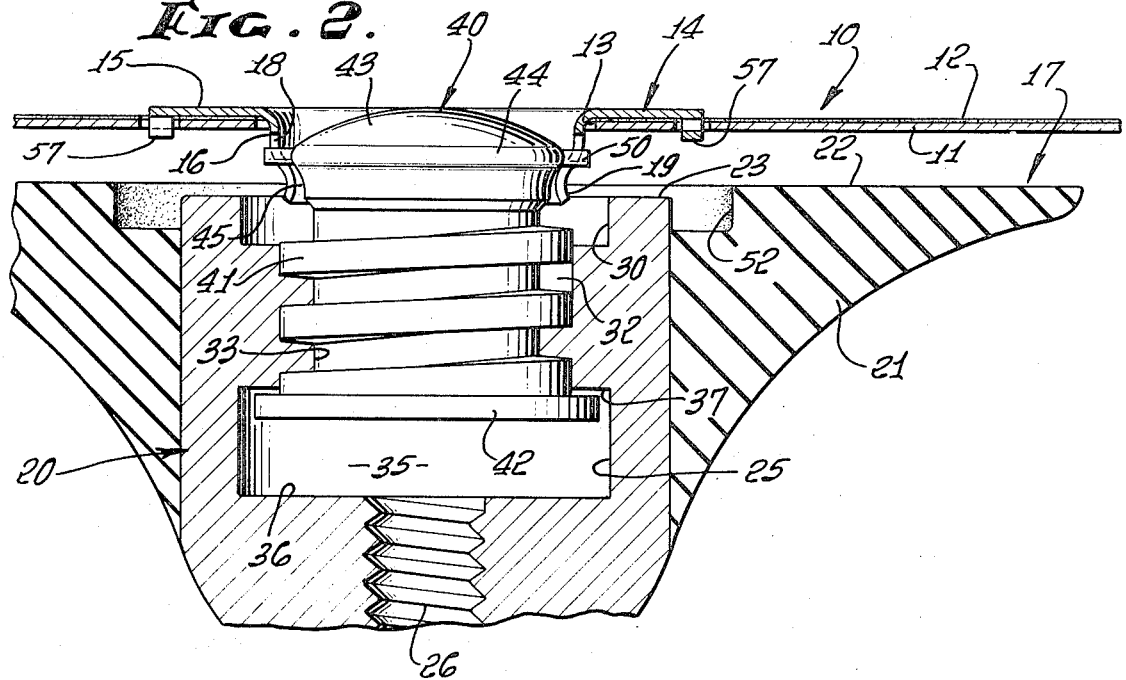
FIG. 2.
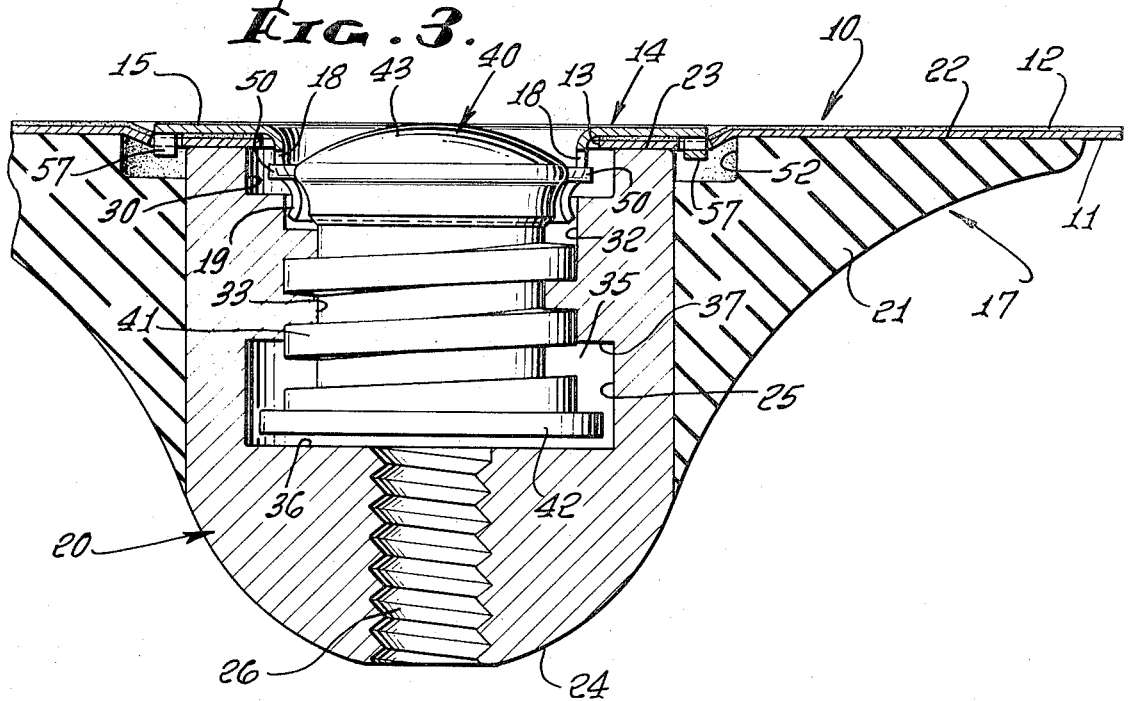
FIG. 3.
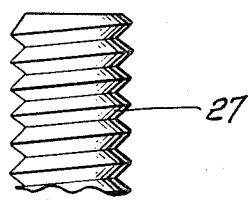

MOUNTING FOR ABRASIVE DISC

BACKGROUND OF THE INVENTION

Abrasive discs rotatable by power means are used for various surfacing operations. Conventionally such a disc comprises a backing sheet coated with a layer of abrasive material.

For securing the disc to a spindle, shaft, or wheel, it is known to adhesively mount a hub on the back side of the disc, the hub being attachable to the end of the spindle. If the torque load is substantial, the disc will tend to rupture at the periphery of the hub or to separate from the hub. In addition to such disadvantages a suitable hub and its permanent mounting on the disc involves a significant cost factor as it must be discarded with the worn out disc.

It is also known to form the disc with a central aperture through which a screw is inserted into the spindle from the abrasive face of the disc. The disc may require a central reinforcing plate or at least a washer between the head of the screw and the abrasive surface.

In one form of prior device the seat on the spindle is countersunk to bring the screw head below the abrasive surface of the disc, and a tapered screw head of relatively larger diameter is employed. In such designs a distortion of the disc is encountered where it bends conically down under the compression of the screw head, and this tends to weaken the disc. Moreover, even with a large diameter screw head a relatively small central area of the disc is engaged.

It is also known to employ magnetic attachment between the seat on the spindle and the disc. This involves the addition of an iron plate to the disc structure, and a magnet in the seat structure, increasing cost, and is not a sufficiently positive attachment under some working conditions.

SUMMARY OF THE INVENTION

The present invention provides a mounting which receives a simple form of abrasive disc comprising a sheet of backing coated with a layer of abrasive material, or formed otherwise. The disc has a central aperture.

A retainer is employed which includes a flange and a collar. The flange overlies a marginal area radially of the disc aperture on the abrasive side, and the collar extends through the cutout. The flange may have prongs stamped out around the periphery which will perforate the disc and can be bent over on the underside to hold the retainer on the disc until it is ready for use.

The collar snaps over a stud and an interlocking engagement is provided. The stud is square threaded in the hub of a wheel and is captive therein but with relative axial movement afforded.

The disc can be mounted by holding the hub and rotating the disc. This rotates the stud, and the threaded relationship of the stud and hub causes mutual axial advance of the retainer and the hub to the point where a face of the hub engages the underside of the disc and clamps the disc between this face and the flange of the retainer. Upon the advancement a portion of the retainer collar becomes confined within a bore of the hub which prevents the collar from expanding and snapping off the stud.

The disc may be removed by reversing the rotation of disc and hub.

Thus the disc may be mounted on and removed from the wheel quickly and without the use of tools. The clamping of the disc between the retainer flange and the hub affords an effective attachment, which is augmented by a tightening through torque resulting during operation.

The face of the hub which engages the disc should be axially offset inwardly from the plane of the wheel face so that the flange of the retainer will lie below the plane of the abrasive surface. However, the flange is thin, and the consequent pull down of the disc very slight and without an abrupt angularity.

BRIEF DESCRIPTION OF THE DRAWINGS

FIG. 2 is a vertical section of the disc and wheel associated, in relationship ready for mounting of the disc on the wheel.

FIG. 3 is a view similar to FIG. 2 with the disc clamped down on the wheel.

PREFERRED EMBODIMENT OF THE INVENTION

Figure 1:
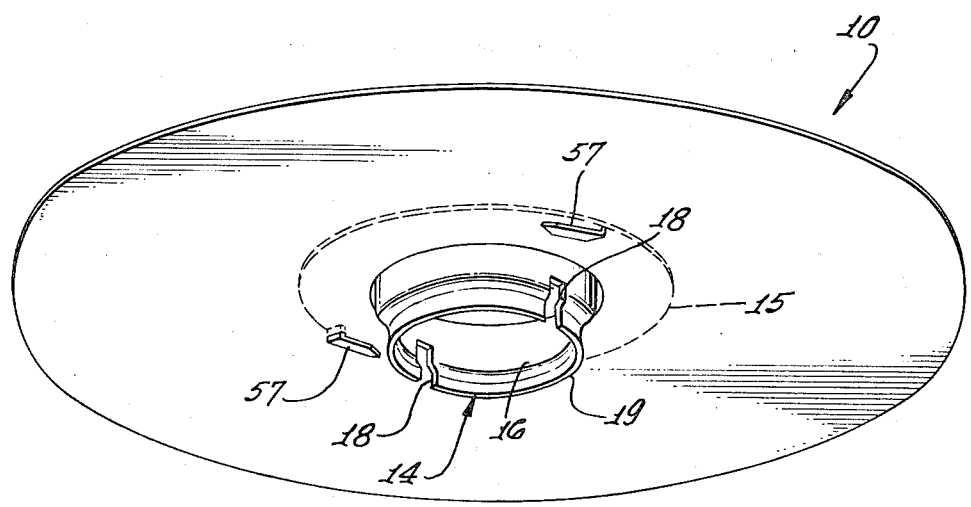
FIG. 1 is a perspective exploded view of a disc and retainer assembly as seen from the bottom, and below that, as seen from the top, a wheel on which the disc is to be mounted.
Figure 1:
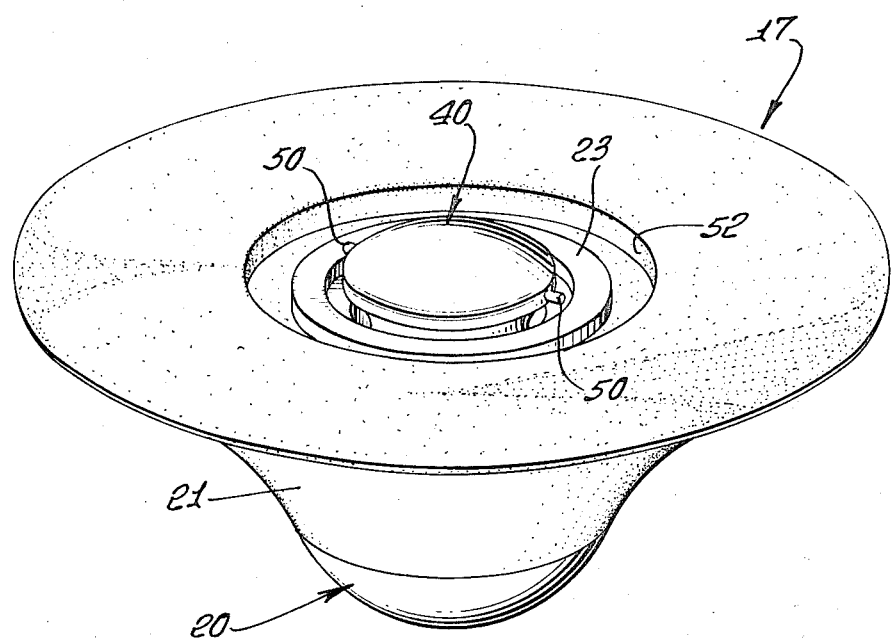

Referring to the drawings, a disc 10 is shown as comprising an annular backing of sheet material 11 and a layer of abrasive material 12. The latter is the work side of the disc. The disc is formed with a central aperture 13.

A retainer 14 is assembled with the disc. It embodies a flat annular flange 15 and a collar 16. The flange is disposed on the work side of the disc and the collar extends through the aperture. Prongs 57 struck from the flange pierce the disc and are bent under to secure the disc and retainer together whereby these two parts may be ready for mounting on a wheel 17.

The collar is split by slots 18, and should possess some resiliency or spring characteristics. It is tapered axially from a large diameter generated at its junction with the flange to a diameter slightly smaller than the head of a stud later described, and preferably embodies a terminal lip or flare 19 turned radially outward.

The retainer illustrated is stamped of relatively thin sheet metal such as 0.020 of an inch. Such description is by way of example only and not of limitation. The retainer could be made of plastic, and whether of metal or plastic could be secured to the disc by means other than the prongs, for example by adhesive. The ultimate torque load is not borne by the securement of the disc to the retainer but by compression of the disc between the flange and the hub 20 of the wheel.

When the disc is worn out it is discarded and the retainer with it. The inexpensiveness of the retainer makes this economically feasible.

The wheel 17 on which the disc is mounted for use includes an annular pad 21 providing a seat 22 for the disc. The pad 21 is conventionally made of rubber or plastic and is bonded to the hub. The latter is made preferably of metal, aluminum for example. The hub has a forward end 23 and a rearward end 24. An axial bore 25 of varying configuration extends through the hub. At the rear end are threads 26 for mounting the hub on a powered spindle or arbor 27. Other means for attachment to an arbor or spindle may be employed.

The forward end of the bore is in the form of a first annular recess 30 immediately adjacent the forward end 23. Such end 23 provides an annular flat seat for the disc concentric with and in general axial alignment with the flange 15 of the retainer.

Extending inwardly from the recess 30 is a second annular recess 32, followed by a threaded section 33. These threads are coarse and preferably square. Between the section 33 and the arbor attachment section 26 the bore is radially enlarged to provide an annular box 35 with a bottom 36 and a top 37.

A stud 40 is disposed in the bore. The central section of the stud is square threaded as at 41 to mesh with the square threads 33 of the hub. It is formed with an inner end flange 42 located within the box 35, by which arrangement the stud is held captive in the hub, but with provision for relative axial movement.

One example of manner in which this hub and stud assembly can be fabricated is to make the hub in two halves weld or bond the halves together around the stud, then slip the rubber pad over the hub with a bonding agent between.

The outer end of the stud is in the form of a head 43 having a major diameter 44 with an inward retraction 45, generally resembling a mushroom shape.

Radially extending from the head at the major diameter are pins 50.

The relative configurations of the retainer 14 and the head 43 of the stud are such that the collar of the retainer may be snapped over the head, with the pins 50 engaged in the slots 18 of the collar. A removable retention is thus obtained, and the collar and stud are rotationally locked together.

Referring to FIG. 2, after the collar is snapped onto the head of the stud, shown in extended position, the operator rotates the disc clock-wise relative to the hub. This causes mutual advance of disc and wheel until the disc is compressed between the flange 15 of the retainer and the end 23 of the hub. This relationship of the parts is shown in FIG. 3.

It is advantageous to locate the plane of the hub end 23 slightly below the seating plane 22 of the wheel pad, and to provide a recess 52 in the pad adjacent the end of the hub, so that when the disc is mounted on the wheel the flange of the retainer will be slightly inward from the abrasive surface of the disc.

During the mounting of the disc as above described, the lip or flared section 19 of the collar 16 enters into the annular recess 32 in the hub. The relative dimensions of the lip and the axial wall of the recess are such that there is sufficient clearance between them to permit a sliding relationship as the stud is screwed down. In the screwed down position the retainer is prevented from accidentally snapping off in use by confinement of the collar in the recess 32 thus preventing expansion necessary for it to snap back over the head of the stud.

The stud is dimensioned in length so that its flange 42 will not bottom in the box 35. This permits the retainer to exert maximum squeeze in clamping the disc between the flange of the retainer and the end of the hub. This clamping pressure increases as the disc is rotated in use.

To remove the disc, it is grasped by the operator while assuring that the hub of the wheel is retained against rotation, and the disc is rotated counterclockwise (looking at the abrasive face of the disc). This unscrews the center stud bringing the retainer collar into its snap-off position, and ready to snap on a new disc.

A square thread is preferred between the body of the stud and the hub so that although they are driven very tight by the work torque, they can be wrenched loose relatively easily. The square thread lessens the "bind."

Although I have herein shown and described my invention in what I have conceived to be the most practical and preferred embodiment, it is recognized that departures may be made therefrom within the scope of my invention.

One example of moification would be to make the collar of the retainer square, mating with a square stud head, so that the collar and the stud head would rotate coordinately when the disc is rotated. This would eliminate the need for pins 50. Whatever be the interlock between the retainer and the stud, the disc performs a wrench action to tighten the flange of the retainer against the end of the hub. The work torque completes the wrenching job.

Moreover, while the stud is shown and described as captive in the bore of the hub, which is preferred for convenience of having the stud always available with the wheel, the flange 42 could be omitted, the stud introduced into the hub from the forward end, and the clamping action previously described would remain the same.

What I claim is:

1. The combination of: a disc having an abrasive work side and formed with a central aperture, a retainer including a flange overlying the work side of the disc in the marginal region of the aperture and further including a member extending through the aperture and having resilient characteristics, a wheel hub having a forward end for engagement with the disc and constructed for attachment to a driving arbor at a rearward end and including a threaded bore open at the forward end, a stud in the bore having threads engaging the threads of the bore and further having a head, the resilient member of the retainer member being releasably disposed on the head of the stud, and being associated with the wheel hub to be retained resiliently between the head of the stud and the hub, whereby relative rotation of flange and hub will draw the flange and hub axially together and clamp the disc between the flange and the forward end of the hub and retain the resilient member between the head of the stud and the hub.

2. A combination as defined in claim 1 which includes means on the stud for making the stud captive in the bore of the hub.

3. A combination as defined in claim 1 in which means are provided on the flange of the retainer to attach the retainer to the disc and retain the disc in fixed relationship to the retainer.

4. A combination as defined in claim 3 in which the last named means comprises prongs on the flange piercing the work side of the disc and turned under the side of the disc opposite the work side to retain the disc in fixed relationship to the retainer.

5. A combination as defined in claim 1 in which the head of the stud has a major diameter at its forward end and an inwardly retracted diameter at a position displaced to the rear and the collar is split and is provided with resilient characteristics to be snapped over the head of the stud in releasable relationship to the head of the stud.

6. A combination as defined in claim 4 in which the split in the collar forms at least one slot, and the head of the stud includes a peripheral projection received in the slot.

7. A combination as defined in claim 5 in which the bore of the hub cooperates with the head of the stud to restrict radial expansion of the collar as the hub advances toward compression with the flange and the disc and thereby prevents the collar from snapping off the stud.

8. A combination as defined in claim 1 in which the threads of the hub and stud are square.

9. A combination as defined in claim 2 in which the threads of the hub and stud are square.

10. A combination as defined in claim 1 in which the bore of the hub includes a section of larger diameter than the root diameter of the threads, and the stud embodies a radial extension disposed in the larger section whereby the stud is maintained captive in the hub.

11. For use with a wheel which includes a threadedly advanceable and retractable stud, an abrasive disc comprising a flat carrier with a working side bearing an abrasive material and having a central aperture, a retainer comprising a flange type ring overlying the working side of the disc in the marginal region of the aperture, means extending from the periphery of the flange type ring into the flat carrier to retain the flat carrier in fixed position relative to the ring, and a coupling element extending from the ring through the aperture and having resilient characteristics to releasably lock over and key to the stud.

12. The abrasive disc as defined in claim 11 in which the coupling element is a split collar of spring characteristics.

13. The abrasive disc as set forth in claim 12 in which the coupling element is slotted at spaced positions around its periphery.

14. The abraisve disc as set forth in claim 13 in which the securing means comprise prongs extending integrally from the ring at spaced positions around the periphery of the ring and in which the collar is integral with the ring and extends in a direction away from the working side of the flat carrier.

15. In combination for use with a hub having a threaded bore and a threaded stud disposed in the bore in cooperative relationship with the threaded bore to become advanced or retracted in the bore, a disc having first and second flat oppositely disposed sides and having abrasive material on the first side to provide a work surface, there being an aperture in the center of the disc, a retainer having a flat flange portion overlying the first side of the disc at a position adjacent the aperture in the disc and having means at the periphery of the flat flange portion for engaging the disc to retain the disc in fixed relationship to the retainer, the retainer having a collar extending through the aperture in the disc beyond the second side of the disc, the collar being slotted at spaced positions around its periphery and being provided with resilient characteristics to be disposed on the stud and to be retained, when disposed on the stud, in the bore of the hub between the stud and the hub.

16. The combination set forth in claim 15 wherein the collar is tapered at progressive positions displaced from the flange portion.

17. The combination set forth in claim 16 wherein the engaging means on the flat flange portion of the retainer constitute prongs extending through the disc and flattened against the second side of the disc.

18. In combination, a disc having first and second flat oppositely disposed sides and having abrasive material on the first side to provide a work surface, there being an aperture in the center of the disc, a retainer having a flat flange portion overlying the first side of the disc at a position adjacent the aperture in the disc and having means at the flat flange portion for engaging the disc to retain the disc in fixed relationship to the retainer, the retainer having a collar extending through the aperture in the disc beyond the second side of the disc, the collar being slotted at spaced positions around its periphery and being provided with resilient characteristics, a hub having a threaded bore, a threaded stud disposed in the bore in cooperative relationship with the threaded bore to become advanced or retracted in the bore, the stud having a head shaped to retain the collar, the collar being removably disposed on the head of the stud between the head and the threaded bore in the hub, and pins extending from the head of the stud into the slots in the collar.

19. The combination set forth in claim 18 wherein the collar is tapered at progressive positions displaced from the flange portion and the head is tapered at progressive positions displaced from the flange portion to retain the collar on the head.

20. The combination set forth in claim 18 wherein the engaging means on the flat flange portion of the retainer constitute prongs extending through the disc and flattened against the second side of the disc.

21. The combination set forth in claim 20 wherein the bore of the hub cooperates with the head of the stud to restrict radial expansion of the collar as the flange and the hub advance toward compression with the disc and thereby prevent the collar from snapping off the stud.

22. The combination set forth in claim 21 wherein the bore of the hub and the stud are shaped to retain the stud in the bore and limit the advance and retraction of the hub relative to the flange and the disc.

* * * * *